Oct. 31, 1961 O. MUELLER 3,006,211
WORM AND WORM WHEEL DRIVE
Filed July 5, 1960
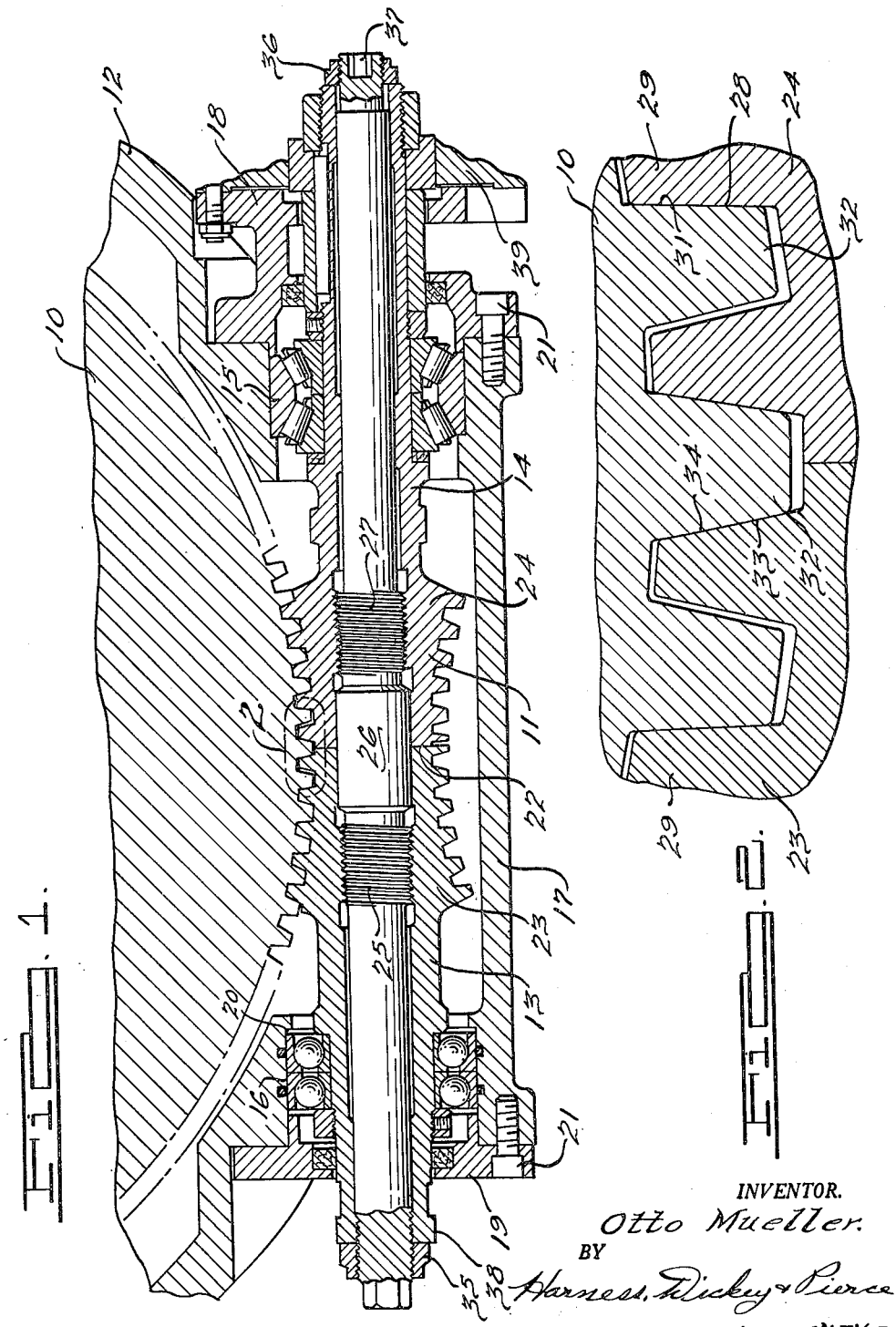
INVENTOR.
*Otto Mueller.*
BY
*Harness, Dickey & Pierce*
ATTORNEYS.

United States Patent Office 3,006,211
Patented Oct. 31, 1961

3,006,211
WORM AND WORM WHEEL DRIVE
Otto Mueller, 13 Byfield Lane, Dearborn, Mich.
Filed July 5, 1960, Ser. No. 40,695
5 Claims. (Cl. 74—440)

This invention relates to worms and worm wheel drives, and particularly to a two-part worm having a thread which engages both sides of the teeth of the wheel to eliminate backlash.

Various methods have been employed heretofore in the art to eliminate backlash from between the thread of a worm and the teeth of a wheel, most of which were difficult to adjust and substantially impossible to maintain in antibacklash relationship.

In the present arrangement, the worm is divided transversely into two halves and secured to a shaft and each half is on separate threads which have a different number of turns to the inch. When the adjacent ends of the two worm halves are in abutted relationship, the one worm half may be rotated relative to the other as the shaft is being rotated to retain the worm halves in abutted relation. By this adjustment, the opposite sides of the flanks of each half of the thread will engage opposite faces of the teeth of the wheel which each half engages. When the thread of one worm half engages the sides of some worm wheel teeth and the thread of the other worm half engages the opposite sides of other of the teeth, backlash is entirely eliminated. When the worm and wheel are of the enveloping type, area engagement occurs between the flanks and faces of the worm and teeth which distributes the load and reduces wear to a minimum. The wheel is preferably made of cast iron to have the same coefficient of expansion as the cast iron housing in which it is mounted.

Accordingly, the main objects of the invention are: to provide a worm and wheel drive with the worm separated transversely of its center line on the diameter of the wheel, with the thread of each half engaging opposite sides of the teeth of the wheel to thereby eliminate any play or backlash between the worm and wheel; to mount two halves of a worm on a shaft having two spaced threads one of which has a greater number of threads per inch than the other, permitting the rotary adjustment of one worm half relative to the other while both halves are in abutted relation due to the axial movement of the shaft as it is rotated; to adjust the flanks of each half of a worm thread in mating relation to opposite faces of the teeth of a wheel by mounting the halves on threads having a different number of turns per inch and in rotating the shaft and one of the worm halves in a relative manner to bring the threads into engagement with opposite sides of the teeth while maintaining the two halves in abutted relation to each other, and, in general, to provide adjustment between two worm halves and differential threads of a shaft to eliminate backlash with engaged teeth, which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein FIGURE 1 is a broken sectional view of a worm and worm wheel drive having backlash eliminated therefrom in a manner embodying features of the present invention, and FIG. 2 is an enlarged, broken sectional view of the thread of the worm and the teeth of the worm wheel illustrated in FIG. 1 within the area 2 thereof.

A worm wheel 10 is mounted for rotation on a shaft to be driven by a worm 11 the thread and teeth of which have enveloping engagement to produce area contact and reduce wear to a minimum. The worm wheel is mounted within a housing 12 to which extending sleeve portions 13 and 14 of the worm halves are mounted for rotation on a fixed thrust roller bearing 15 and a floating ball bearing 16. The ball bearing 16 has a slip fit within an aperture 20 in which it is free to move as the sleeves 13 and 14 and the worm 11 expand or contract. The worm is mounted within the extending portion 17 of the housing 12 which is enclosed at the ends by caps 18 and 19 which are secured in position by screws 21.

The worm 11 is split on a line 22 on the diameter of the wheel 10, permitting one worm half 23 to be rotated relative to the other worm half 24. The worm half 23 is mounted upon a thread 25 in abutting relation to the worm half 24 which is mounted upon a thread 27, the threads being spaced on a shaft 26. The thread 25 has a different number of turns per inch than the thread 27, the differential relation of the threads permitting the one worm half to be rotated relative to the other half while both halves are maintained in abutted relation on the line 22 through the rotation of the shaft 26 which moves slightly axially.

Referring to FIG. 2, it will be noted that the thread and teeth of the worm and worm wheel have been adjusted to have exact mating relationship. The worm half 24 has the flank 28 of the thread 29 in mated engaged relation with the right-hand face 31 of a tooth 32 of the wheel 10. To bring the right-hand flank 33 of the thread 29 of the worm half 23 into engagement with the left-hand face 34 of a tooth 32, the worm half 23 must be rotated on the thread 25 as the shaft is rotated to maintain the worm halves in abutting relation to each other. Such adjustment maintains the thread of the worm in enveloping relationship with the teeth of the wheel and the left-hand flank 28 of the thread 29 of the right-hand worm half 24 in engagement with the right-hand face 31 of the teeth 32 as the right-hand face 33 of the flank of the thread 29 of the left-hand worm half 23 engages the left-hand face 34 of the teeth 32. In this manner, the backlash is entirely eliminated from between the thread and teeth of the worm and wheel which are in enveloping relationship, providing area engagement which substantially minimizes wear and increases the load carrying capacity of the drive. The low friction and area engagement between the thread and worm requires very little adjustment once the teeth and thread have been moved into the relationship as illustrated in FIG. 2.

The shaft 26 is driven from the left-hand end and is locked to the sleeve 13 of the worm by a nut 35. The opposite end of the shaft is similarly locked to the sleeve 14 by a nut 36, the end of the shaft having a recess 37 for receiving an Allen wrench by which the shaft may be turned. The sleeve 13 has a hexagonal head 38 on the end which permits the rotatable adjustment of the worm half 23 on the shaft 26. A magnetic brake 39 may be provided on the right-hand end of the sleeve 14 but since this forms no part of the present invention it is not herein described.

What is claimed is:
1. In a reduction drive, a worm wheel having teeth thereon, a worm having a thread thereon matable with the teeth of the wheel, said worm being constructed in two halves, a shaft having spaced threads of different numbers of turns per inch on which the worm halves are mounted, and means for securing the worm halves in fixed relation to the shaft permitting the shaft and a worm half to be relatively rotated to bring the flanks of the thread into engagement with the teeth while maintaining the two worm halves in abutting relationship.

2. In a worm and worm wheel drive, a worm wheel having teeth on its peripheral edge, a two-part worm having a thread on its peripheral edge, a shaft having adjacent threads with the one thread having more turns to the inch than the other thread, each part of the worm having an internal thread threaded upon a thread of the shaft with the adjacent faces in abutted relationship, means for mounting said worm parts to have their threads disposed in driving relation with the teeth of the worm, and means for rotating one of the worm parts relative to the other when maintained in abutting relationship through the rotation of the shaft and the differential relationship of the threads to have the thread of the worm parts engage opposite sides of the teeth of the wheel.

3. In a worm and worm wheel drive, a worm wheel having teeth on its peripheral edge, a two-part worm having a thread on its peripheral edge, a shaft having adjacent threads with the one thread having more turns to the inch than the other thread, each part of the worm having an internal thread threaded upon a thread of the shaft with the adjacent faces in abutted relationship, means for mounting said worm parts to have their threads disposed in driving relation with the teeth of the worm, means for rotating one of the worm parts relative to the other when maintained in abutting relationship through the rotation of the shaft and the differential relationship of the threads to have the thread of the worm parts engage opposite sides of the teeth of the wheel, a double-acting thrust bearing for supporting one end of the worm parts, and a floating bearing supporting the other end thereof.

4. In a worm and worm wheel drive, a worm wheel having teeth, a worm having a thread, the teeth and thread being so constructed as to be in enveloping relation to each other, said worm being provided in two halves, and a shaft having two threads thereon of a different number of turns per inch onto which the halves of the worm are threaded to be in abutting relation to each other, the rotation of one half of the worm on its thread as the shaft is rotated maintaining the two halves in abutting relation as one side of the thread is moved into engagement with one side of the teeth and the opposite side of the thread engages the opposite side of the teeth.

5. In a worm and worm wheel drive, a worm wheel having teeth thereon, a two-part worm having a thread engaging said teeth, a shaft for supporting said two-part worm for adjustment thereon, said worm parts and shaft having sloping engaging surfaces, the angle of slope of the sloping surfaces of one worm part and shaft being different from the angle of the slope of the sloping surface of the other worm part and shaft, and means for maintaining the two worm parts in engaged relation to each other and said surfaces in various positions of adjustment thereof.

References Cited in the file of this patent

UNITED STATES PATENTS

| | | | |
|---|---|---|---|
| 472,517 | Beale | Apr. 12, | 1892 |
| 2,273,784 | Kahl | Feb. 17, | 1942 |
| 2,485,280 | Grace | Oct. 18, | 1949 |
| 2,786,360 | Cameron | Mar. 26, | 1957 |